United States Patent [19]

Thiel et al.

[11] 4,234,536
[45] Nov. 18, 1980

[54] METHOD FOR THE MANUFACTURE OF THIN-WALLED SHAPED ARTICLES OF CRYSTALLINE THERMOPLASTIC MATERIAL

[75] Inventors: Alfons W. Thiel, Mainz; Barbara Geppert, Wiesbaden, both of Fed. Rep. of Germany

[73] Assignee: Bellaplast GmbH, Wiesbaden, Germany

[21] Appl. No.: 946,392

[22] Filed: Sep. 27, 1978

Related U.S. Application Data

[63] Continuation-in-part of Ser. No. 818,876, Jul. 25, 1977, abandoned.

[51] Int. Cl.³ .......................... B29D 7/20; B29F 3/08
[52] U.S. Cl. ................................ 264/522; 264/544; 264/551; 264/151; 264/153; 264/210.5; 264/237; 264/290.2; 264/327

[58] Field of Search ................... 264/210 R, 327, 519, 264/520, 521, 522, 237, 553, 210.1, 210.5, 544, 322, 551, 290.2, 151, 153; 425/445, 404

[56] References Cited

U.S. PATENT DOCUMENTS

| | | | |
|---|---|---|---|
| 3,042,972 | 7/1962 | Lafferty | 264/522 |
| 3,454,693 | 7/1969 | Crenshaw | 425/328 |
| 4,039,609 | 8/1977 | Thiel et al. | 264/210 R |
| 4,105,386 | 8/1978 | Thiel et al. | 425/367 |

FOREIGN PATENT DOCUMENTS 2116487  7/1972  France .

*Primary Examiner*—Jeffery R. Thurlow
*Attorney, Agent, or Firm*—LeBlanc, Nolan, Shur & Nies

[57] ABSTRACT

A method of manufacturing thin-walled articles by thermoforming from crystalline thermoplastic sheet or web material wherein the sheet or web is rapidly pre-cooled from extrusion temperature, and the outer surface layers reheated prior to thermoforming.

18 Claims, 15 Drawing Figures

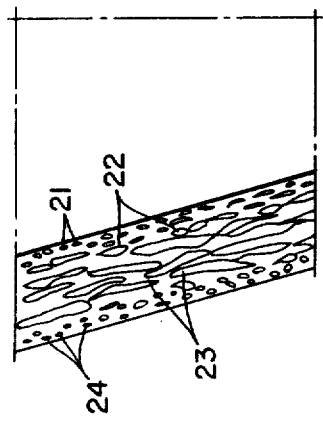
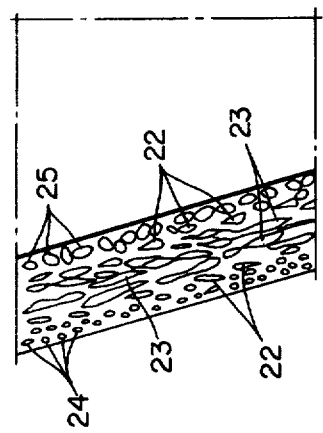
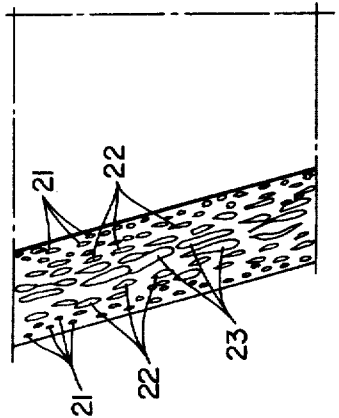
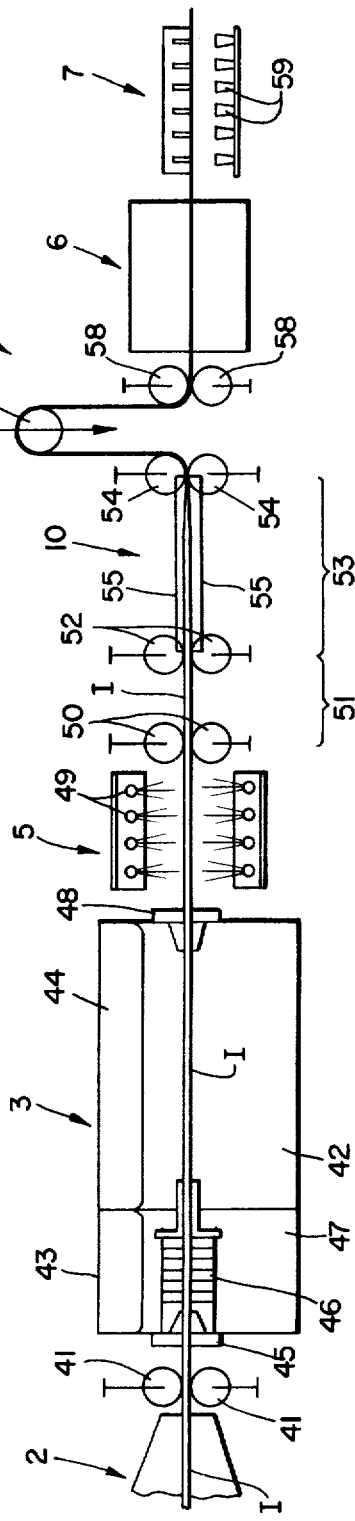

METHOD FOR THE MANUFACTURE OF THIN-WALLED SHAPED ARTICLES OF CRYSTALLINE THERMOPLASTIC MATERIAL

This is a continuation-in-part of Ser. No. 818,876 filed July 25, 1977, now abandoned.

This invention relates to the manufacture of thin-walled articles such as cups, plates and the like containers, of synthetic crystalline thermoplastic material, and particularly to special method steps important in connection with the crystalline character of the used thermoplastic material.

In manufacturing thin-walled articles by thermal forming of crystalline thermoplastic material sheets or webs it is known from U.S. Pat. No. 3,709,976 to heat the cold web to a temperature of 6° to 30° C., preferably 6° to 17° C., below the crystalline melting range. This would be for instance for polypropylene a temperature of about 150° to 165° C. In a quite similar method disclosed in French Pat. No. 2,116,487 it is known to manufacture thin-walled articles by thermal forming of polyolefin sheet material. According to this known method the cold sheet material is heated to a temperature which is about 2° C. to 10° C. lower than the crystalline melting temperature of the particular material.

Both of these known methods have distinctive disadvantages and principal defects, because the sheets or webs of crystalline thermoplastic material must be heated from outside, so that the outer surface regions of the sheets or webs are heated very much more than the inner core portion. Therefore a web or sheet when entering the thermal forming step in such known methods has a very high temperature gradient across the sheet or web thickness and a substantial temperature difference over the sheet or web thickness. Due to this fact the thermal forming conditions across the sheet or web thickness are much different and it is not possible to obtain positive control of the quality of the articles produced in such known methods. If it is desired to overcome such quality defects in these known methods it would be necessary to equalize the temperature conditions across the sheet or web thickness, but this would require prolongated heating period, which is an important economic disadvantage of such processes.

In a similar method disclosed in U.S. Pat. No. 3,157,719 polypropylene is extruded as a web and separated into sheets of desired length. Such sheets are cooled down practically to room temperature. In the thermal forming of such material it is first subjected sheet by sheet to a preliminary heat treatment in an oven at a temperature of about 130° C. to 140° C. for a period of about 2-3 minutes. Thereafter the so-heated sheet to be thermoformed is transported directly over a thermoforming tool and subjected to a second heat treatment to further heat the material to a temperature at or higher than its crystalline melting temperature, so that the sheet sags down onto the tool surface and is drawn into close contact with that tool surface by vacuum applied to the tool. Such a known method cannot be used for high throughput requirements. Further it is a substantial defect of this known method that temperature conditions for thermalforming cannot be positively controlled. Further it is not possible to control the growth of crystals in the material during the thermalforming step.

Therefore the main technical problem solved by the invention is to provide an improved control in the temperature conditioning of a crystalline thermoplastic web or sheet material in order that a temperature profile across the web or sheet thickness can be provided or prepared before the web or sheet enters the thermalforming step, this imparted temperature profile being adapted in each respective case to correspond to optimal thermoforming conditions and optimal cooling conditions of the material in order to obtain high quality articles.

According to the present invention this technical problem is solved by the fact that temperature conditioning involves at least two steps:

(a) developing by heating and/or cooling a preliminary temperature profile across the thickness of the web or sheet in which the core material of the web or sheet is at a temperature close to but lower than the critical crystalline melting temperature range of the crystalline thermoplastic material, and the outer surface regions of the web or sheet are at a lower temperature than the core material and may be such that the crystalline thermoplastic material of the outer surface regions is solidified and therefore not easily deformed; and then (b) developing the final temperature profile for the thermoforming step by reheating the outer surface regions of said web or sheet to temperature conditions at which the crystalline thermoplastic material of the outer surface regions becomes at least elastically deformable, whereas the core material is retained in an elastically deformable state at a temperature adjacent to but lower than the critical crystalline melting temperature range.

By such novel temperature conditioning in a web or sheet when entering the thermalforming step temperatures of the inner core material and the temperature of the surface regions of the web or sheet will be held within narrow ranges close to the desired respective temperatures. Thereby as well desired thermoforming conditions and desired cooling conditions during the entire process can be positively controlled. Therefore growth of crystals in the material during the entire process is well controllable. Such control may be for substantially avoiding growth of crystals or may be for controlling growth of crystals to an allowable extent.

In connection with the present invention, during development of the final temperature profile just before the thermoforming step at least one of the outer surface regions of the web or sheet may be reheated to a temperature adjacent to but lower than the crystalline melting point temperature $T_M$ of the particular material. Another possibility in connection with the present invention is that while developing that final temperature profile at least one of the outer surface regions of the web or sheet is reheated to a temperature higher than said crystalline melting point $T_M$ to heat that outer surface region of the web or sheet into a plastically deformable state. When processing in this manner the outer surface material of the web is heated to a plastic or even liquid state, such that the outer surface material is free of crystals when entering the thermalforming step. But contrary to the method known by French Pat. No. 2,116,487 such reheating at the outer surface regions of the web or sheet and the temperature reached by such heating are well controllable, and therefore in connection with the present invention a growth of crystals in the outer surface regions of the web or sheet can be positively controlled by rapid cooling during the thermalforming step. Such rapid cooling may occur at the shaped surface in contact with the shaping tool surface or it may occur at a second surface of the article wall which is not in contact with the tool, as by additional cooling means or cooling media to be brought in contact with that second surface.

Reheating the one or two surface regions of the web or sheet to a temperature higher than the crystalline melting point of the respective material has the effect that the outer surface regions of the article wall have substantially increased and improved dimensional stability under heat and further improved surface characteristics such as surface hardness, surface luster and so forth. Some similar effects also may be achieved in the known process such as described in French Pat. No. 2,116,487, but in this known process control of the conditions for obtaining such effects is not possible. Further in such known processes the reheating and temperature conditions are very much more critical, so that product properties are less controllable than in the process according to the present invention. Furthermore the temperature variations across the sheet just prior to forming are much wider in these known processes and therefore the finished product properties will be less controllable.

The present novel method for manufacturing thin-walled articles from crystalline thermoplastic material by thermoforming may be performed in embodiments.

One embodiment of the present invention provides that developing the preliminary temperature profile involves heating by external means a web or sheet of the crystalline thermoplastic material such that the core material reaches a temperature close to but lower than the lower limit $T_C$ of its critical crystalline melting temperature range, even though the outer surface regions of the web or sheet may reach temperatures within or higher than that critical melting temperature range; and rapidly cooling the outer surface regions of said web or sheet through the critical melting temperature range to a temperature lower than that of the inner core material while essentially controlling growth of crystals within the outer surface regions material.

A preferred embodiment of the present novel method is characterized by a substantially uninterrupted sequence of steps comprising:

(a) extruding a web of selected crystalline thermoplastic material at a temperature above the crystalline melting point $T_M$ of the said material;

(b) substantially immediately rapidly precooling the opposite surfaces of said web in a manner and to such extent that the core material of the web is cooled down to a temperature adjacent to but lower than the critical crystalline melting temperature range of the particular cyrstalline thermoplastic material, this being done at a predetermined cooling rate to predeterminely control growth of crystals in these surface regions material and in the core material of the web, even though the outer surface regions of the web may be cooled down to a temperature in which the crystalline thermoplastic material is substantially solidified and not thermally deformable;

(c) allowing the outer surface regions of said web to be partially reheated by heat conducted from the core and adding by external means sufficient heat such that the outer surface regions become at least elastically deformable at a temperature adjacent to but lower than the critical crystalline melting temperature range, and (d) then thermally forming and rapidly cooling said web to shape the desired article while continuing to essentially control growth of crystals within said material during thermalforming.

Such preferred embodiment combines the technical advantages of a highly effective in-line-method of production with special measures and precautions to selectively and accurately avoid or to control growth of crystals during the method steps, and to improve temperature preconditioning of the material before thermoforming such that an optimal temperature profile across the thickness of web or sheet can be prepared before such web or sheet enters the thermoforming step.

Known so-called in-line methods are disclosed in U.S. Pat. No. 4,039,609. Principles of such known in-line processes comprise plastisizing thermoplastic material, preferably of granular kind, by heating and compressing in an extruder press, casting the material by a coat hanger nozzle to form a web, precooling the web for stabilizing to make the web capable of being transported to a thermalforming station, and thereafter thermally forming the web to shape the desired article. Such known in-line processes are highly effective for manufacturing certain articles but they involve the necessity to cool down the thermoplastic material from its extrusion temperature to the normal room temperature during the whole of the process. But on the other hand such known in-line processes have the economic advantage that practically all of the heat introduced into the material for plastisizing the extruder press can be saved for use in the thermoforming step. Such economic advantage is also maintained in the preferred embodiment of the invention, because precooling is only such that the core material of the web or sheet reaches its suitable and desired temperature for thermoforming, whereas only the relatively thin outer surface regions of the web or sheet need some reheating and a considerable amount of heat needed for such reheating is taken from the core material as heat is conducted from the core to the outer surface regions of the web or sheet as above explained.

Some more specific possibilities to practice the process according to the present invention will be described hereunder in connection with the accompanying drawings.

Brief Description of Drawings

FIG. 5A, 5B and 5C still more enlarged fragmentary views in section illustrating the crystalline conditions in the wall of an article shaped under the respective conditions a, b and c of FIGS. 2Ba, 2Bb and 2Bc.

FIG. 7 is a diagrammatic view or a modified stabilizing means useful in connection with the method of the invention for manufacture of thin-walled articles from crystalline thermoplastic material.

Figure 1A:
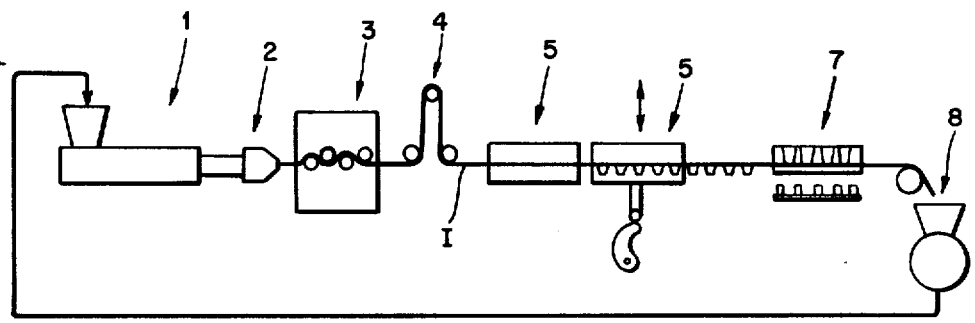
FIGS. 1A and 1B are substantially diagrammatic views showing two possiblities for practicing the method of the invention for shaping thin-walled articles from crystalline thermoplastic material in which the precooled thermoplastic web is reconditioned and reheated by external means before thermoforming.
Figure 2A:
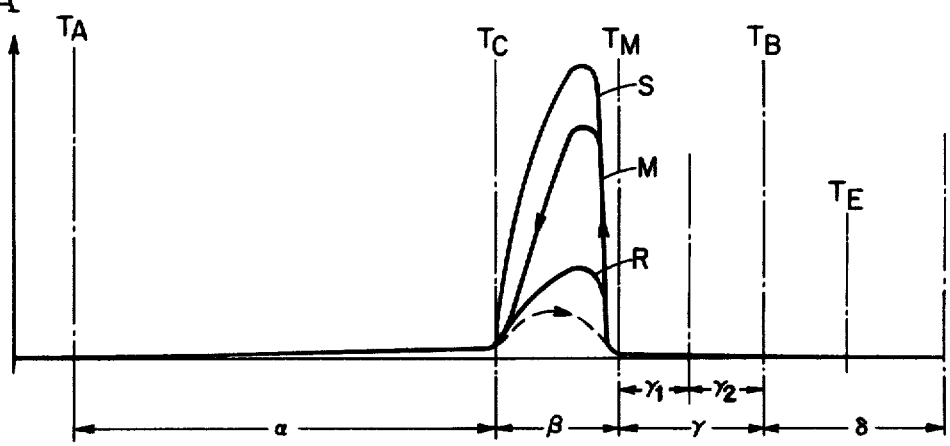
FIGS. 2A and 2Ba, 2Bb and 2Bc are graphic views illustrating temperature relationships in the crystalline thermoplastic material for some possibilities in performing the novel methods illustrated in FIGS. 1A and 1B.

According to the aspect of the invention illustrated in FIG. 1A crystalline thermoplastic material is heated and compressed and plasticized in an extrusion press 1 and flows out from a coat hanger nozzle 2 as a web I to be immediately taken through a stabilizing station 3. Such a stabilizing station 3 may contain a plurality of web surface contacting cooling rollers or may have any one of the constructions as described below in connection with FIGS. 6 and 7. During such stabilizing the web I is cooled down through the critical crystalline melting temperature range of the respective crystalline thermoplastic material. By such cooling the core material achieves a temperature which is close to but lower than critical temperature $T_C$ which as shown in FIG. 2A is at the lower limit of the critical crystalline melting temperature range $\beta$ of the particular material. This may be seen from the curve G in FIGS. 2Ba, 2Bb and 2Bc. By such cooling the outer surface regions of the web I may be cooled to relatively low temperature so that these outer surface regions of the web would not be further deformable. In the examples illustrated by FIGS. 2Ba, 2Bb and 2Bc the extrusion temperature $T_E$ is conventionally that of the material but in any case above the crystalline melting point $T_M$ of the particular crystalline thermoplastic material. In the stabilizing step the web is very rapidly cooled down so that further growth of the crystals in the material may be practically avoided during such cooling. If desired for any reason the cooling may be such that the cooling rate is lower and the cooling time period is long enough to obtain an accurately predetermined controlled growth of crystals in the material. After stabilizing, the web I is continuously advanced from the stabilizing station 3 to a motion control feed conversion device 4 for converting the continuous advance of the web into intermittent advance.

The intermittently advancing web passes through a dwell station 5 where the recently formed and surface cooled stabilized web is reconditioned by heat conducted from the core material and where further sufficient heat is usually added by external means such that all layers or regions of the web achieve an elastically deformable condition. The web thus receives a desired final temperature profile as shown by the curves H in FIGS. 2Ba, 2Bb and 2Bc. Having achieved this desired final temperature profile the web is introduced into the thermal forming station 6 there to be thermoformed under accompanying rapid cooling conditions as will be described below. Thereafter the shaped articles may be cut out from the web I in the cutting station 7.

Figure 1B:
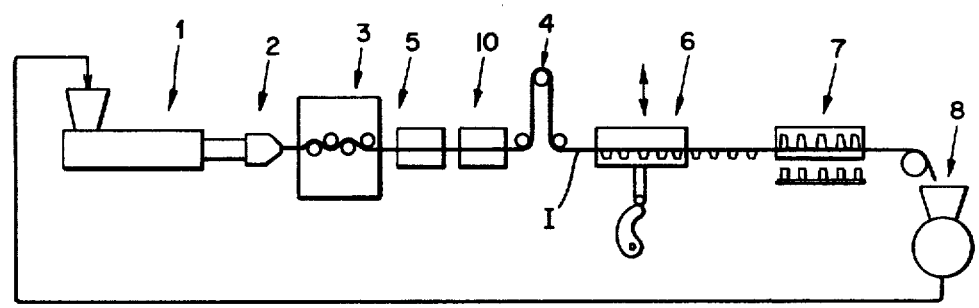

In the modification shown in FIG. 1B a station 10 is provided for a biaxial stretching step of the web. In this modification the station 5 for reheating the outer surface regions of the web I is arranged directly behind the stabilizing station 3. After the surface regions of the web have been reheated a biaxial stretching action is provided to improve the mechanical properties of the web and the articles manufactured therefrom. When leaving the stretching station 10 the web is introduced into the motion control feed conversion device for converting the continuous advance of the web into intermittent advance. From said motion control feed conversion device 4 the web is fed into the thermal forming station 6. After the articles have been shaped in the way they may be cut out in the cutting station 7. In both of the possibilities shown in FIGS. 1A and 1B the residual web portions may be recovered and granulated in an additional station 8. The so recovered material may be recycled to the extruder press 1.

Figure 2B:
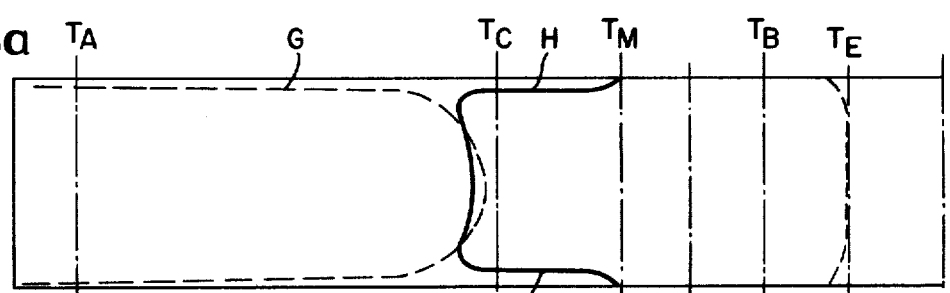
Figure 2B:
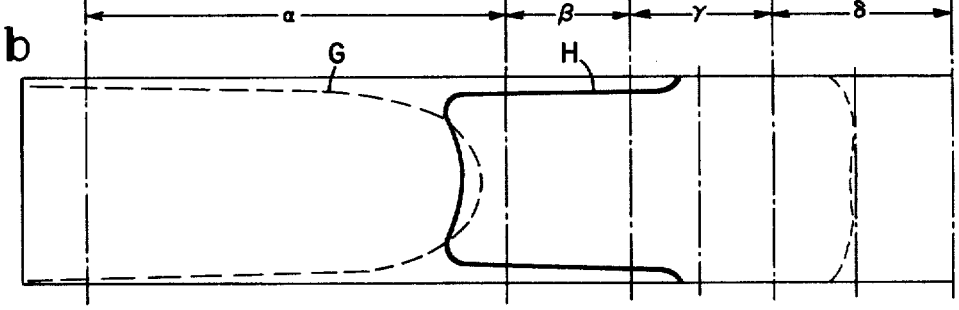
Figure 2B:
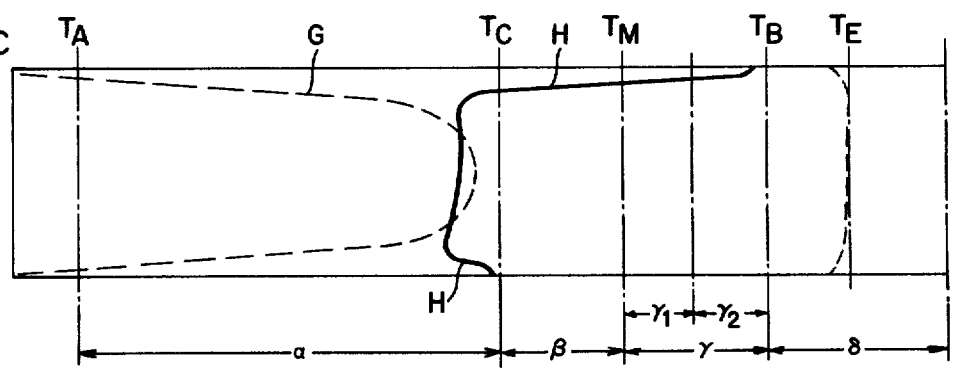

FIGS. 2A and 2Ba, 2Bb and 2Bc are graphics to illustrate the temperature relationships and the special temperature conditions which should be preferably used in connection with the method as generally described above in connection with FIGS. 1A and 1B. As shown in FIG. 2A and 2Ba, 2Bb and 2Bc the interesting temperature ranges may be considered as follows:

There is a lower temperature limit $T_C$ at which melting of crystals will begin when heating the crystalline thermoplastic material in question. Below such critical temperature limit $T_C$ there is a temperature range $\alpha$ within which practically no growth of crystals occurs in the material. Such temperature range normally is that within which the crystalline thermoplastic material is thermally formable but such thermoforming is almost a stretching action under elastic deformation so that an article shaped under temperature conditions in this temperature range is more or less elastically deformed and stretched particularly locally in some operation and has relatively poor dimensional stability under heat. When cooling down the crystalline thermoplastic material through the lower temperature limit $T_A$ of said temperature range $\alpha$, the material is practically no longer extensible or permanently deformable.

Above the critical temperature $T_C$ there is a critical crystalline melting temperature range $\beta$ up to an upper limit temperature $T_M$. Within this critical temperature range $\beta$ growth of crystals occurs when cooling down crystalline thermoplastic material through this temperature range $\beta$. Above the upper limit temperature $T_M$ of the critical crystalline melting temperature range $\beta$ for most crystalline thermoplastic materials exists a temperature range $\gamma$, which is frequently used for thermal forming. This is true especially for the lower part $\gamma_1$ of this temperature range $\gamma$ whereas the upper part $\gamma_2$ also is a suitable temperature range for conventional thermal forming. These temperature ranges $\gamma_1$ and $\gamma_2$ however present significant difficulties in forming because the sheet has very little melt strength and is practically unable to support its own weight during transport and working steps. The upper limit temperature $T_B$ of this temperature range $\gamma$ is followed by an upper temperature range $\beta$, which is especially useful for injection, molding and extrusion processes. So FIGS. 2Ba, 2Bb and 2Bc shows an extrusion temperature $T_E$ which is within said upper temperature range $\beta$.

From FIG. 2A and FIG. 2Ba, 2Bb and 2Bc it may be seen that the problem that, during an in-line process for producing thermoformed articles of crystalline thermoplastic material, cooling down must be provided from the extrusion temperature $T_E$ to a temperature, for instance of temperature $T_A$ at which the material of the article solidifies, and which requires cooling the material through the critical temperature range $\beta$ within which growth of crystals occurs.

As may be seen from FIG. 2A within the above mentioned temperature range $\beta$, the so-called crystalline melting temperature range, substantial crystalline changes occur in the material. Such changes involve melting of crystals as well as growing up of crystals. The lower limit of this critical temperature range $\beta$ may be called the critical temperature $T_C$ and the upper limit may be the crystalline melting point temperature $T_M$. When heating the material above temperature $T_C$ to a temperature within the said crystalline melting temperature range $\beta$ the small crystals which are already contained in the cooler material begin to grow up, but on the other hand these crystals begin to melt as the material is further heated. For that reason the dotted line curve through range $\beta$ in FIG. 2A, which is relative to heating the material was found to be substantially flatter than the full line curves thereabove relating to cooling the material. When cooling the crystalline thermoplastic material from above the crystalline melting point temperature $T_M$ through the critical temperature range $\beta$ to a temperature lower than the critical temperature $T_C$ at first the material is in an amorphous condition. When the material reaches temperatures within the critical temperature range $\beta$ crystals begin to develop and to grow up. The growth of crystals and the final size which the crystals will reach by such cooling depends on the length of time during which the temperature of the material is within the said critical temperature range $\beta$. This may be seen by the three different curves S for cooling slowly, M for medium cooling rate and R for cooling rapidly, in FIG. 2A.

Therefore it is possible to control the growth of crystals in a crystalline thermoplastic material by using a predetermined cooling rate within the critical temperature range $\beta$. If cooling slowly a relatively coarse crystalline structure of the material will be obtained, whereas if cooling rapidly a relatively fine crystalline structure of the material is obtainable.

Having in mind the method described above in connection with FIGS. 1A and 1B it is clear that when cooling down the material from the extrusion temperature $T_E$ to the normal room temperature of the article at any time it is necessary to cool the material through the critical temperature range $\beta$. It is therefore a special object of the present invention to find special ways by which such cooling through the critical temperature range $\beta$ can be done so as to control the growth of crystals in the material in any desired manner.

What has been surprisingly discovered is that the rapid cooling through range $\beta$ and favorable control of the crystal structure in the core region of the web can be just as well achieved by only partial cooling of the web as by cooling it completely to ambient temperature.

FIGS. 2B$a$, 2B$b$ and 2B$c$ shows some preferred possibilities for such cooling down in which growth of crystals in the core regions of the web may be substantially reduced and by which satisfactory temperature conditions for thermal forming can be obtained while controlling such growth.

As shown by the curves G in the three cases FIGS. 2B$a$, 2B$b$ and 2B$c$ the web is cooled down from its extrusion temperature $T_E$ so much that the inner core material of the web reaches a temperature which is lower than the critical temperature $T_C$, but it may be substantially adjacent to the critical temperature $T_C$. These temperature profile curves G obtained by precooling are shown somewhat different in the cases FIGS. 2B$a$, 2B$b$ and 2B$c$ to illustrate that such cooling down may be undertaken under different conditions but in any case it is essential that the inner core material has a temperature lower than $T_C$, but substantially higher than the solidifying temperature $T_A$.

When reheating the outer surface regions of the web some heat is conducted from the inner core material to the outer surface regions of the web. So due to this heat loss the inner core of the web will cool somewhat further as may be seen by the inner region of the curves H in the three cases FIGS. 2B$a$, 2B$b$ and 2B$c$. Further such reheating of the outer surface regions of the web is combined with adding heat by external means. In FIG. 2B$a$ substantially the same amount of heat is added at the two opposite surfaces of the web, so that the temperature profile curve H here will become practically symmetrical. The amount of added heat by external means to both of the web surfaces will be such that the web surface temperature will come into the critical crystalline melting temperature range $\beta$, but as shown by dotted lines in FIG. 2A growth of crystal size is substantially lower when reheating. Previously formed crystals tend to melt if the temperature reaches $T_M$ However experience has shown that growth of crystal size is not significant within layers that are briefly heated to lower temperatures in the range $\beta$ where significant melting does not take place.

Therefore growth of crystal size in the outer surface regions of the web is sufficiently controllable whenever reheating into the said critical crystalline melting temperature range $\beta$. As may be seen in FIGS. 5A, 5B and 5C such processing is able to produce structural conditions in the article wall, in which the inner core material of the wall contains middle size crystals 22 to large size crystals 23. Both such types of crystals are in regions having a stretched condition. Further the crystal size will be larger in the innermost regions and smaller in the regions adjacent to the surface region of the article wall. In the outer surface regions of the article wall small crystals 21 are present in the material. These small sized crystals developed when the web was cooled down through the critical crystalline melting temperature range $\beta$. But such cooling down in the outer regions of the web was so rapid that no substantial growth of crystals was able to occur. As soon as cooling occured in the thermal forming step such growth of crystals was definitely stopped. But such cooling in thermal forming was somewhat more rapid at the surface of the article wall which was in contact with the cooled tool surface whereas the crystals in the other surface region of the wall which was not in contact with the cooled tool surface somewhat more growth of crystals was possible. But as illustrated in connection with FIGS. 4B and 8 additional cooling can be provided to also minimize growth of crystals in the article wall surface region not in contact with the tool surface.

Further it is seen in FIG. 5A that some stretching may be obtained in the small size crystals of the outer surface regions also. But such stretching is relatively small, because crystals in the outer surfaces have been practically melted at temperatures close to $T_M$, and therefore crystals were not present in those surface layers during deformation.

In a second possibility illustrated FIGS. 2B$b$ and 5B reheating the outer surface regions of the web involves adding heat by external means in such an amount that the material in these outer surface regions of the web will be reheated to a temperature above the crystalline melting point $T_M$. So the web enters the thermal forming step under conditions that its core material contains middle size and larger size crystals which may be unstretched under a process condition as shown in FIG. 1A or may be prestretched when using method conditions as illustrated in FIG. 1B. In any case the material in the outer surface regions of the web is free of crystals when entering the thermal forming step, because it is in plasticized nearly liquid condition and all crystals previously present have been melted during the preheating step. Under such conditions some growth of crystals will occur in the outer surface regions of the web or the article wall respectively during the time the shaped article wall cools down. At the one side which is in contact with the cooled tool a rapid cooling occurs and therefore only very small crystals develop in the material of such surface region of the article wall as it is illustrated at 24 in FIG. 5B. As the cooling and therefore the crystallization occurs in this zone after the deformation of the web is finished, such crystals are in an essentially unstretched and unoriented condition. In the material of the other surface region cooling down is slower and therefore the crystals can grow up to a middle size type but generally unstretched and unoriented as illustrated at 25 in FIG. 5B. This may be desirable in some cases in order to get a higher stiffness and hardness of the surface. But in some cases it may be desirable to obtain structural conditions of the material in the second surface region of the article wall which are practically the same one as in the first surface region. This means that growth of crystals in the second surface region of the article wall has to be minimized also. This may be done by additional cooling at the surface of the shaped article wall which is not in contact with the cooled tool surface. Such possibility for additional cooling will be described below in connection with FIGS. 4B and 8.

Another possibility to avoid growing up of crystals to a middle sized type can be to reheat only that one of the surface regions of the web which is intended to be cooled in contact with the cooled tool surface during the thermal forming step to a temperature above the crystalline melting point temperature $T_M$. The other surface region of the web may be reheated only to a lower temperature for instance to a temperature adjacent to but lower than the crystalline melting point $T_M$. The reheating temperature of the second surface may even be adjacent to but lower than the critical temperature $T_C$. The latter possibility is illustrated in FIGS. 2Bc and 5B. When reheating the outer surface regions of the web in such a manner of course the temperature profile curve H will become unsymmetrical. However this does not cause any difficulties in connection with the present invention. As illustrated in FIG. 5C the inner core regions of the article wall will contain stretched or oriented middle size crystals 22 and stretched or oriented larger type crystals 23, practically in the same manner as illustrated in FIGS. 5A and 5B. Further that one of the surface regions which is cooled in contact with the cooled tool surface will obtain structural conditions in the material practically the same as pointed out above in connection with FIG. 5B. This means that in this cooled surface only small sized unstretched crystals 24 will be present. In the opposite or second surface region of the article wall there are only very small unstretched crystals, because the material in this second surface region was cooled down very rapidly in the precooling step and was only reheated to a temperature lower than the critical temperature $T_C$. If the reheating step in this second surface region of the web is provided to a temperature within the critical crystalline melting temperature range $\beta$, practically the same crystalline structural conditions are obtained in the second surface region as shown at the right side of FIG. 5A.

Figure 3:
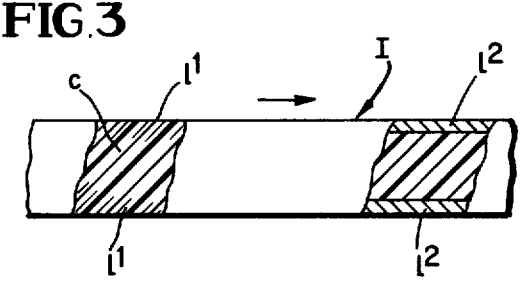
FIG. 3 is an enlarged fragmentary view partly in section illustrating internal web conditions.

The conditions discussed above in connection with FIGS. 2A, 2Ba, 2Bb and 2Bc are illustrated in the enlarged section view of FIG. 3. During the precooling step the web I is so precooled that the outer surface regions will become solidified supportive layers $1^1$, which may be at a temperature at which permanent deformation of thermoforming is not possible. But the core material C is cooled down to a temperature adjacent to but lower than the critical melting temperature range so that the core material of the web is thermoformable, substantially by elastic deformation under stretching. The core material C is retained under such temperature condition, whereas the outer surface regions are reheated as illustrated at $1^2$, so that they are plastically deformable under conditions as discussed in connection with FIGS. 2Ba, 2Bb and 2Bc.

Figure 4A:
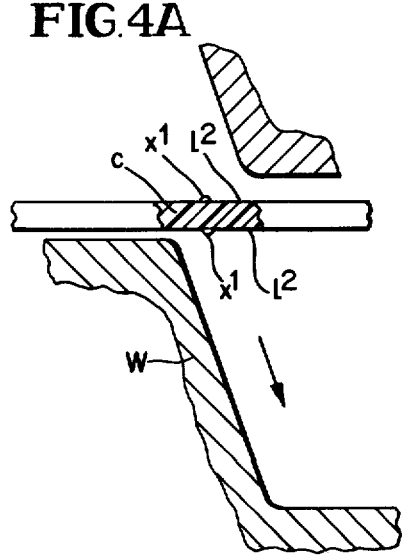
FIGS. 4A and 4B are enlarged fragmentary views in section illustrating web shaping operations in the method according to FIGS. 1a and 1b.
Figure 4B:
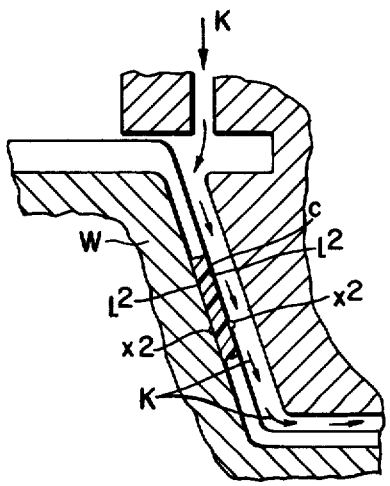

As shown in FIGS. 4A and 4B during the thermal forming step the thickness of $x^1$—$x^1$ of the web is substantially reduced to obtain the desired thickness $x^2$—$x^2$ of the article wall. During such deformation under thickness-reduction a substantial stretching of the core material C occurs whereas the surface layers $1^2$ are plastically deformed over the stretched core material C. As further illustrated in FIG. 4B the one surface of the web or the article wall respectively is cooled by contact with the cooled surface of the tool W. The other surface of the shaped article wall may be cooled by cooling medium introduced into the tool as illustrated by the arrows K. Such cooling medium may be gaseous medium or a cooling liquid or it may be powdered dry-ice blown onto and over the said surface to be cooled.

Figure 6:
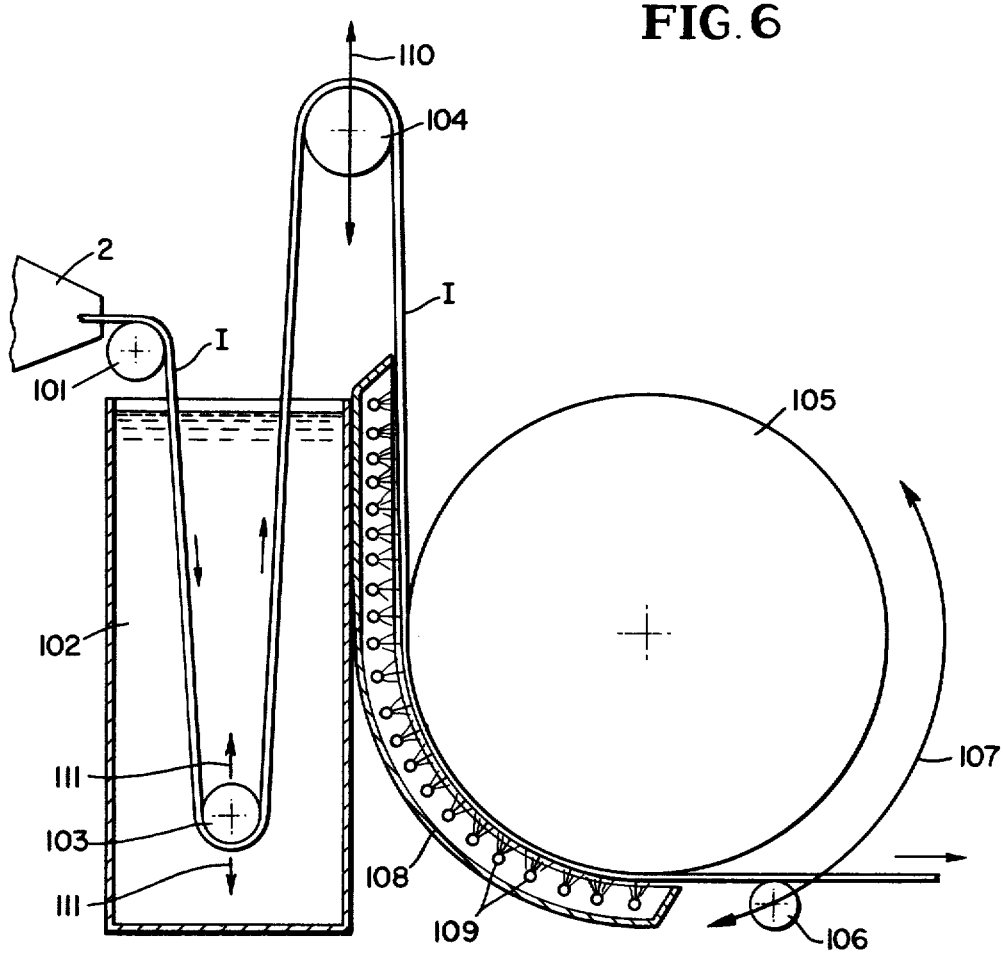
FIG. 6 is a diagrammatic view for a stabilizing and transport motion transfering means useful in connection with the method of the invention for manufacturing thin-walled articles from crystalline thermoplastic material.

FIG. 6 shows a novel combination of stabilizing and motion converting stations. In this novel combination the hot web I is immediately introduced by a guiding roll 101 into a liquid cooling bath 102. The web moves by a continuous advance substantially vertically downwardly within said bath to a lower deflection roller 103. From this deflection roller 103 the web I moves through the cooling bath 102 substantially vertically upwardly and outwardly to a second deflection roller 104, which is mounted for bodily upward and downward movement illustrated by the double arrow 110 above the cooling bath 102. By such bodily upward and downward movement of said deflection roller 104 the continuous advance of the web I is converted to a intermittent or stepwise advance in accordance and synchronism with the stepwise thermal forming action at the web as performed in the thermal forming station 6 of FIGS. 1A and 1B.

In order to control the cooling action within the bath 102 the lower deflection roller 103 may be adjusted with respect to the height at which it is mounted within the bath 103. When adjusting the deflection roller 103 to an upper level the movement path of the web within the bath 103 is shortened and so the cooling action is reduced. When adjusting the deflection roller 103 to a lower level the movement path of web I within the bath 102 becomes longer and so the cooling action is increased. Roller 103 may be end supported and clamped in suitable vertical slide guides for purposes of this adjustment.

When leaving the dancer deflection roller 104 the precooled web I reaches a reconditioning drum 105 the surface of which may be heated to add heat to the surface in contact with drum 105. As drum 104 and the web portion in contact with it are moved intermittently it is advisable to adapt the area of the web I in contact with the surface of said drum 105 to correspond with the length of a web portion to be thermoformed in one step. For such adjusting an additional deflection roller 106 may be provided which is adjustable around the reconditioning drum 105 in the sense of the arrow 107 as illustrated in FIG. 6. Such adjusting is only necessary when changing a tool set and the advance step in the subsequent thermal forming station 6.

In order to reheat the second or opposite surface of the web I an outer reheating means 108 extending along the web I and containing a number of heating elements 109 is provided the length of which is the same as the maximum length of contact area between said first web surface and the reconditioning drum 105. Of course the effective length of the reheating means 108 along the web I has to be adjusted to the length of the advance steps provided for the thermal forming station 6. Such adjusting may be done by switching on only such member of heating elements 109 of the reheating means 108 which is relevant to the desired length of advance step.

In the embodiment illustrated in FIG. 6 the reheating means 108 involves infrared radiant heating elements 109, but there may be provided heating elements 109 of any other kind, for instance nozzles to direct jets of steam or hot liquid onto the said second web surface.

In the embodiment according to FIG. 7 the extruded web I produced in a coat hanger nozzle 2 is taken over by a pair of cooled transporting rolls 41 and continuously advanced into a precooling means 3. In this embodiment the precooling means is constructed similar to a calibrating means containing liquid cooling medium. Such a calibrating means 42 in this embodiment has two chambers 43 and 44.

The first chamber 43 at its inlet side has a sealing flange means 45 and connected thereto a cooling plate set 46 which is in contact with the surfaces of the web I. At the end of this cooling plate set is a transfer tube 47 opening into the second chamber 44. Within the first chamber 43 the liquid cooling medium is circulated through the cooling plate set 46 so that the cooling effect becomes maximum effective. In the second chamber 44 the web I is drawn constantly through a liquid cooling medium which is maintained in circulation around the said web I. At the outlet of the second chamber 44 a sealing flange means 48 is provided. When coming out from the precooling means 3 the web I is drawn through a device 5 to add heat to both of the surfaces of web I in order to recondition the outer surface regions of the said web in a manner as described above in connection with FIG. 2Ba. Such reheating means may contain infrared radiant heating elements 49. When leaving the said reheating means 5 of the web I is taken over by a pair of transport rollers 40 which are constantly driven with the same speed as the pair of rollers 41. Thus web I is constantly drawn through the precooling means 3 and the reheating means 5. At a distance 51 from the pair of transporting rollers 50 a second pair of transporting rollers 52 is provided. These second transporting rollers 52 are driven at a predetermined higher speed than the transporting rollers 50, so that the web I is stretched in its longitudinal direction over this distance 51.

After a further distance 53 a further pair of transporting rollers 54 is provided which is driven at practically the same speed as the transporting rollers 52. Between the transporting rollers 52 and the transporting rollers 54 a stretching device 55 is arranged such that the web I is gripped at its side edges and oppositely drawn sideways so as to be stretched in the transverse direction.

From the pair of transport rollers 54 at the outlet side of the transverse stretching distance 53, the biaxially stretched web I is taken over from a dancer roller 56 which is able to move bodily upwardly and downwardly as illustrated by the double arrow 57. This dancer roller 56 is the main element of the motion control feed conversion device 4. At the outlet side of this motion conversion device 4 a pair of intermittently driven transporting rollers 58 is provided to feed the web I stepwise to the thermal forming station 6 when the thermoforming device is opened. After the articles 59 have been thermally shaped in the web, they are removed and stamped out in the stamping out station 7.

Figure 8:
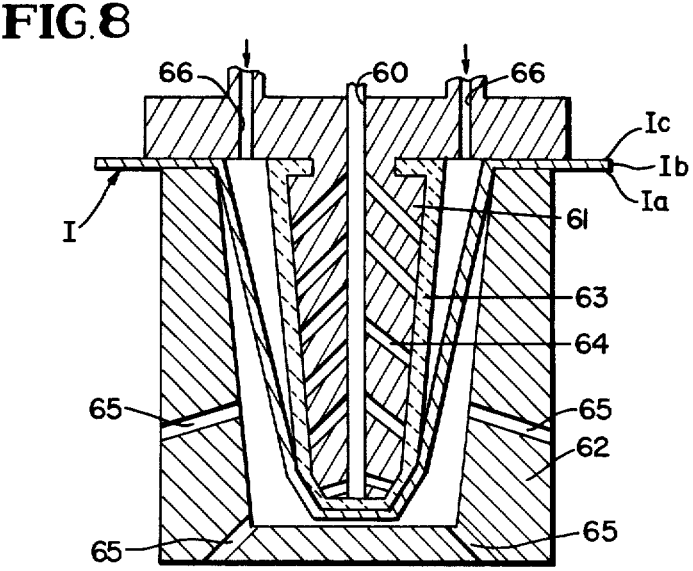
FIG. 8 is a sectional view illustrating a thermal forming means useful in connection with the invention for producing thin-walled articles from crystalline thermoplastic material.

A preferable possibility for the construction of the thermal forming means contained in the thermal forming station 6 is shown in FIG. 8. In this embodiment a female die 62 is provided working together with a stretching element 61, which is coated at the web engaging surface with a heat insulating porous layer, for example a felt layer 63. Stretching element 61 is provided with an inlet bore 60 and branching bores 64 adapted to be connected to supply compressed air which will be finally distributed by the felt covering 63. The interior of the female die 52 is provided at the outer side of the web with evacuation bores 65 allowing timed application of vacuum. The design and the operation of such shaping device are known per se, as disclosed in U.S. Pat. No. 4,039,609. When using a thermal forming device according to FIG. 8 in connection with the present invention the stretching element 61 at first stretches the web I so that its inner layer is elastically deformed under stretching, or further stretching respectively if restretching has been provided according to FIG. 7. Further elastical deformation will be obtained by pressing the web I by introduced air under pressure against the metal inner surface of the female die 62. When doing so, the hot and deformable outer surface layer I$a$ of the web is pressed against the surface of the cooled female shaping tool 62. The core layer I$b$ is stretched and distributed between the outer layers. The inner surface layer I$c$ of the web is cooled by the introduced air pressure. If it is desired to have a more intensive cooling some cooling medium may be introduced at 66 into the space between the stretching element 61 and the shaped web portion.

In connection with the present invention crystalline thermoplastic material of different kinds may be used. Preferably crystalline olefine material may be used in this process. Special materials suitable to be used in connection with the above method may be:

Polyethylene (middle Pressure production), having
 a density in the range between 0.924 and 0.945 (g/cm$^3$).
 a crystalline melting temperature range between 115° C. and 127° C. and
 a crystallinity of 65% to 76%

Polyethylene (low pressure production), having
 a density between 0.945 and 0.965 (g/cm$^3$),
 a crystalline melting temperature range of 127° C. to 137° C. and
 a crystallinity of 75% to 95%.

Isotactic polypropylene having
 a density in the range between 0.908 and 0.905 (g/cm$^3$),
 a crystalline melting temperature range between 140° C. and 170° C. and a crystallinity of 60% to 70%.

Random co-polymerisation product of ethylene and propylene.

Block co-polymerisation product of ethylene and propylene.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method for manufacturing thin-walled articles from crystalline thermoplastic material by thermoforming the articles in a web or sheet of said thermoplastic material and removing the shaped articles from said web or sheet, said thermoplastic material having a critical crystalline melting temperature range with a lower limit temperature $T_C$ and an upper limit temperature $T_M$ and said method further including temperature conditioning of said web or sheet for thermoforming, characterized in that said temperature conditioning involves at least two steps; namely:

(a) developing by heating and/or cooling a preliminary temperature profile across the thickness of said web or sheet in which the core material of the web or sheet is at a temperature close to but lower than the critical crystalline melting temperature range of the said crystalline thermoplastic material and wherein said core is elastically deformable and the outer surface regions of the web or sheet are at lower temperatures than the core material and not thermally formable; and (b) developing a final temperature profile for the thermoforming step by reheating one or both of said outer surface regions of said web or sheet to a temperature within said critical crystalline melting range whereby the said crystalline thermoplastic material of the outer surface regions becomes elastically deformable, whereas the said core material is retained in an elastically deformable state at a temperature adjacent to but lower than said critical crystalline melting temperature range.

2. A method defined in claim 1, wherein at least one of the said outer surface regions of said web is reheated to a temperature adjacent to but lower than the crystalline melting point temperature $T_M$ at the upper limit of the critical crystalline melting range of the said material.

3. A method defined in claim 1, wherein at least one of said outer surface regions of said web is reheated to a temperature higher than the upper limit temperature $T_M$ of said crystalline melting point range to heat said outer surface regions of said web into a plastically deformable state.

4. The method as defined in claim 1, wherein developing the said preliminary temperature profile includes heating by external means a web or sheet of said crystalline thermoplastic material until the core material reaches a temperature close to but lower than said lower limit $T_C$ of said critical crystalline melting range, even though the outer surface regions of said web or sheet may reach temperatures within or higher than said critical melting temperature range; and then rapidly cooling said outer surface regions of said web or sheet down through said critical melting temperature range to a temperature lower than that of the inner core material while essentially controlling growth of crystals within said outer surface regions.

5. A method defined in claim 1, characterized by the substantially uninterrupted sequence of steps comprising:

(a) extruding a web or said thermoplastic material at a temperature above the crystalline melting point temperature $T_M$ at the upper limit of the critical melting temperature range of said material;

(b) substantially immediately rapidly precooling at the opposite surfaces of said web in a manner and so much that the core material of said web is cooled down to a temperature adjacent to but lower than the critical crystalline melting temperature range of the said crystalline thermoplastic material at a predetermined cooling rate to control growth of crystals in the material in said surface regions and in the said core material of the said web, said outer surface regions being cooled until they are not thermally formable;

(c) allowing said outer surface regions of said web to be partially reheated by heat conducted thereto from the warmer core and adding sufficient external heat that said outer surface regions become at least elastically deformable at a temperature adjacent to but lower than said critical crystalline melting temperature range; and (d) then thermally forming and cooling said web to shape the desired article while continuing to essentially control growth of crystals within said material during said thermally forming.

6. The method defined in claim 5, wherein said rapid precooling at the opposite surfaces of said web is such that further growth of crystals in the outer surface regions of the web is essentially avoided.

7. The method defined in claim 5, wherein said rapid precooling at the opposite surfaces of said web is such that further growth of crystals in said outer surface regions and in the said inner core region material of said web is essentially avoided.

8. The method defined in claim 5, wherein said rapid precooling at the opposite surfaces of said web is produced by contact of said surfaces with a fluent cooling medium held at a predetermined temperature.

9. The method defined in claim 1, wherein a sheet or web is subjected to a forming tool operation for thermal forming, in which tool the said inner core layer is shaped by elastic deformation under stretching and stabilized by final cooling of the article wall, whereas the reheated outer layers are distributed and plastically deformed over said core in plasticized or fluid state so to produce outer layers of the articles free of crystal orientation.

10. The method defined in claim 1, wherein the said crystalline thermoplastic material is an isotactic polypropylene having a crystalline melting temperature range between 160° C. and 168° C., the web or sheet is formed initially by extrusion at an extrusion temperature within the range of 220° C. to 270° C., and the web or sheet entering the shaping tool operation has a core temperature in the range of 130° C. to 160° C. and a temperature at its outer surface regions in the range of 140° C. to 168° C.

11. The method defined in claim 1, wherein the said crystalline thermoplastic material is an isotactic polypropylene having a crystalline melting temperature range between 160° C. and 168° C., the web or sheet is formed initially by extrusion at an extrusion temperature within the range of 220° C. to 270° C., and the web entering the shaping tool operation has a core temperature in the range of 130° C. to 160° C. with one of the outer surface regions of said web or sheet having a temperature in the range of 140° C. to 168° C. and the other surface layer of the web or sheet having a temperature in the range of 168° F. to 270° C.

12. The method defined in claim 1, wherein said crystalline thermoplastic material is an isotactic polypropylene having a crystalline melting temperature range between 160° C. and 168° C., the said web or sheet is formed initially by extrusion at an extrusion temperature within the range of 220° C. to 270° C., and the web or sheet entering the shaping tool operation has a core temperature in the range of 130° C. to 160° C. and a temperature at its outer surface regions in the range of 168° C. to 270° C.

13. The method as defined in claim 1, wherein the said crystalline thermoplastic material is a low pressure produced oplyethylene having a density of 0,945 to 0,965 g/m³, a crystallinity of 75% to 95% and a crystalline melting temperature range between 130° C. to 135° C.

14. The method defined in claim 1, wherein the said crystalline thermoplastic material is a random copolymerisation product of ethylene and propylene.

15. The method defined in claim 1, wherein the said crystalline thermoplastic material is a block copolymerisation product of ethylene and propylene.

16. The method defined in claim 1, wherein one surface of the article wall is cooled during thermoforming by contact with a cooled thermoforming tool and at the other wall surface is cooled by a fluent cooling medium directed into contact with said other wall surface.

17. The method defined in claim 16, wherein said cooling of the other article wall during the said thermoforming is obtained by powdered dry ice blown into contact with the said outer wall surface.

18. A method for manufacturing thin-walled articles from thermoplastic sheet or web material according to claim 1, wherein the web or sheet after being developed to its final temperature profile and prior to thermoforming is subjected to biaxial stretching.

* * * * *